United States Patent
Matsunaga

(10) Patent No.: US 7,393,390 B2
(45) Date of Patent: Jul. 1, 2008

(54) HOLLOW FIBER MEMBRANE AIR DRIER

(75) Inventor: Hiroshi Matsunaga, Yokohama (JP)

(73) Assignee: Anest Iwata Corporation (JP)

( * ) Notice: Subject to any disclaimer, the term of this patent is extended or adjusted under 35 U.S.C. 154(b) by 514 days.

(21) Appl. No.: 11/160,215

(22) Filed: Jun. 14, 2005

(65) Prior Publication Data

US 2005/0279209 A1 Dec. 22, 2005

(30) Foreign Application Priority Data

Jun. 22, 2004 (JP) ............... 2004-183166

(51) Int. Cl.
*B01D 53/22* (2006.01)
(52) U.S. Cl. .............. 96/10; 96/4; 96/7; 96/8; 96/417; 95/1; 95/45; 95/52
(58) Field of Classification Search ......... 96/4, 96/7, 8, 10, 417; 95/1, 45, 52
See application file for complete search history.

(56) References Cited

U.S. PATENT DOCUMENTS

| | | | | |
|---|---|---|---|---|
| 3,735,559 | A | * | 5/1973 | Salemme .................. 95/52 |
| 4,955,998 | A | * | 9/1990 | Ueda et al. ................ 95/54 |
| 5,108,464 | A | * | 4/1992 | Friesen et al. ............. 95/52 |
| 5,226,932 | A | * | 7/1993 | Prasad ...................... 96/6 |
| 5,236,474 | A | * | 8/1993 | Schofield et al. .......... 96/10 |
| 5,605,564 | A | * | 2/1997 | Collins ..................... 95/52 |
| 5,681,368 | A | * | 10/1997 | Rahimzadeh ............. 96/8 |
| 6,273,937 | B1 | * | 8/2001 | Schucker ................. 95/45 |
| 6,478,852 | B1 | * | 11/2002 | Callaghan et al. ........ 96/8 |
| 6,540,817 | B1 | * | 4/2003 | Hachimaki ............... 96/8 |
| 6,616,735 | B1 | * | 9/2003 | Burban et al. ............ 96/8 |
| 2007/0277673 | A1 | * | 12/2007 | Crowder et al. .......... 95/52 |

FOREIGN PATENT DOCUMENTS

DE 198 12 960 C1 * 11/1999
JP 11-226345 * 8/1999

* cited by examiner

*Primary Examiner*—Jason M Greene

(57) ABSTRACT

Air is introduced from an intake chamber into a plurality of hollow fiber membranes in a casing. The casing is connected to a vacuum pump via a three-way valve and water vapor in air is evacuated through the membranes. Dehumidified or dried air is discharged from a discharge chamber at the ends of the membranes. The vacuum pump is connected to a detector/selector. If the vacuum pump is out of order, it is detected by the detector/selector and another dehumidifier including a depressurizing device is actuated.

6 Claims, 2 Drawing Sheets

|   | TWO-WAY VALVE 10 | VACUUM PUMP 14 | THREE-WAY VALVE 13 | SELECTOR VALVE 16 |   |
|---|---|---|---|---|---|
| a | ON | OFF | AIR | OFF | ONLY PURGING |
| b | ON | ON | VACUUM PUMP | OFF | PURGING AND VACUUM PUMP |
| c | OFF | ON | VACUUM PUMP | OFF | ONLY VACUUM PUMP |
| d | OFF | OFF | AIR | ON | BYPASS |

HOLLOW FIBER MEMBRANE AIR DRIER

BACKGROUND OF THE INVENTION

The present invention relates to a hollow fiber membrane air 5 drier in which air is dehumidified. A known hollow fiber membrane air drier comprises hollow fiber membranes made of polymer fibers which allow water vapor to pass easily through the membranes through the hollow fiber membranes, but makes a gas difficult to pass, the membrane being included in a casing, humidified compressed air being supplied in the hollow fiber membrane to make vapor penetrated out so that dehumidified or dried air may be obtained.

The hollow fiber membrane air drier has no movable parts and need not electric energy; has small size and light-weight; provides high durability and generates no drainage. Such an air drier is very advantageous and widely used in a lot of equipment.

To carry out dehumidification continuously in such a hollow fiber membrane air drier, it is necessary for the outside of the hollow fiber membrane to be kept in lower water vapor partial pressure.

Pressure of dried air is partially reduced and relative humidity is reduced, so that it is forwarded to the outside of the hollow fiber membrane to cause difference in pressure of water vapor. It is discharged to air with water vapor which passes through the hollow fiber membrane, which is called as a water-vapor purging dehumidifier which is generally used.

However, without allowing purging air to flow, an evacuating dehumidifier is suggested in which the outside of a hollow fiber membrane is evacuated to vacuum and reduced in water vapor partial pressure for dehumidification. However, energy for vacuum source is required.

In a hollow fiber membrane air drier, to prevent dehumidified partial air from being used for purging, without generating purging air as above, the outside of the hollow fiber membrane is evacuated by a vacuum source. If abnormality should occur in the vacuum source to cause failure in evacuation, the hollow fiber membrane air drier will lose its function. So air that is not dehumidified is forwarded to the end of use to result in inconvenience in quality of products and during operation.

In a water-vapor purging dehumidifier in which dehumidified air is partially used, if its part should be out of order so that dried air is not partially forwarded to the outside of the hollow fiber membrane, similar disadvantages will occur.

If a dehumidifier involves abnormality to cause lack in performance, no means for going on dehumidification without inconvenience exist so far as the inventor knows.

SUMMARY OF THE INVENTION

In view of the foregoing disadvantages in the prior art, it is an object of the present invention to provide a hollow fiber membrane air drier that has a water-vapor purging dehumidifier in which dried air is partially used, or a vacuum-evacuating dehumidifier for evacuating water vapor through a hollow fiber membrane by vacuum, dehumidification going on even if one of the dehumidifiers is out of order.

BRIEF DESCRIPTION OF THE DRAWINGS

The features and advantages of the invention will become more apparent from the following description with respect to embodiments as shown in appended drawings wherein.

DETAILED DESCRIPTION OF PREFERRED EMBODIMENT

Figure 1:
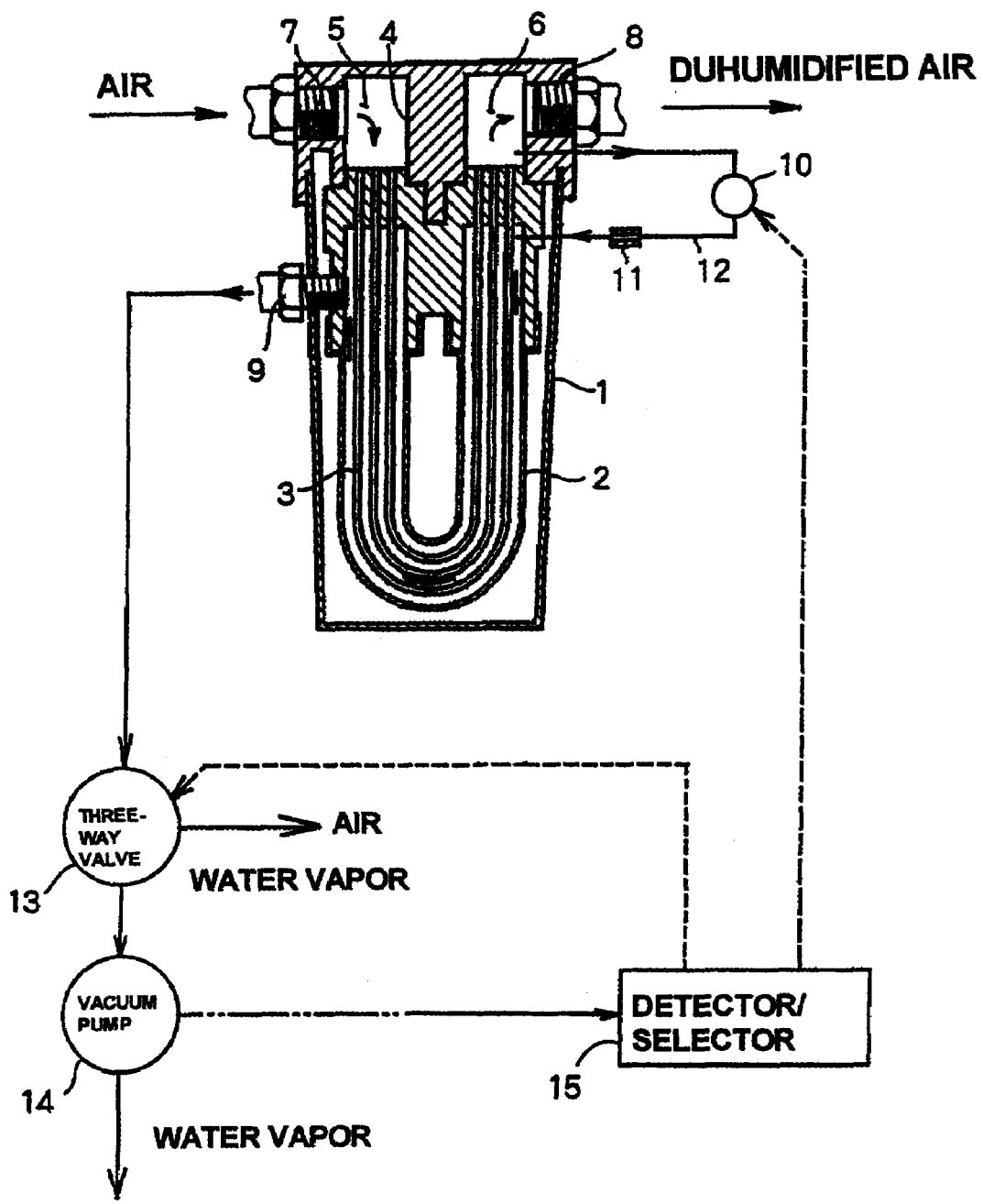
FIG. 1 is a vertical sectional view which shows the first embodiment of the present invention.

In FIG. 1, a U-shaped tubular casing 2 is fixed in a cylindrical body 1, and in the casing 2, there is a hollow fiber membrane 3 comprising polymers which allow water vapor to pass easily through the membrane 3, but makes $N_2$ and $O2$ difficult to pass therethrough.

At the end of the cylindrical body 1, there are an intake chamber 5 and a discharge chamber 6, each communicating with openings at the end of the casing 2. Between the chambers 5 and 6, a partition wall 4 is provided. There are an air inlet 7 and a dehumidified air outlet 8 at the outer sides of the chambers 5 and 6.

Under the air inlet 7, a coupling 9 is provided on the cylindrical body 1, and the inner end of the coupling 9 opens through the outer wall of the casing 2. To the discharge chamber 6 and the vicinity of the discharge chamber 6, a bypass pipe 12 is connected, comprising a two-way valve 10 and a depressurizing device 11 comprising an orifice. A vacuum pump 14 is connected to the coupling 9 via a three-way valve 13.

The vacuum pump 14 is connected to the two-way valve 10 and the three-way valve 13 via a detector/selector 15. During normal operation, the three-way valve 13 allows the coupling 9 to communicate with the vacuum pump 14 and the two-way valve 10 closes. If discharging from the casing 2 becomes poor owing to abnormal operation in the vacuum pump 14, the detector/selector 15 detects it to actuate the three-way valve 13 and the two-way valve 10 thereby allowing the coupling 9 to communicate with the air and forwarding the part of dry air in the discharge chamber 6 to a portion in the casing 2 near the discharge chamber 6 via the bypass pipe 12.

If abnormality occurs in the bypass pipe 12 which comprises the two-way valve 10 and the depressurizing device 11, the detector/selector 15 allows the two-way valve 10 to close thereby making vapor-purging dehumidification inactive and actuating the three-way valve 13 to carry out vacuum-evacuating dehumidification.

Figures 2, 3:
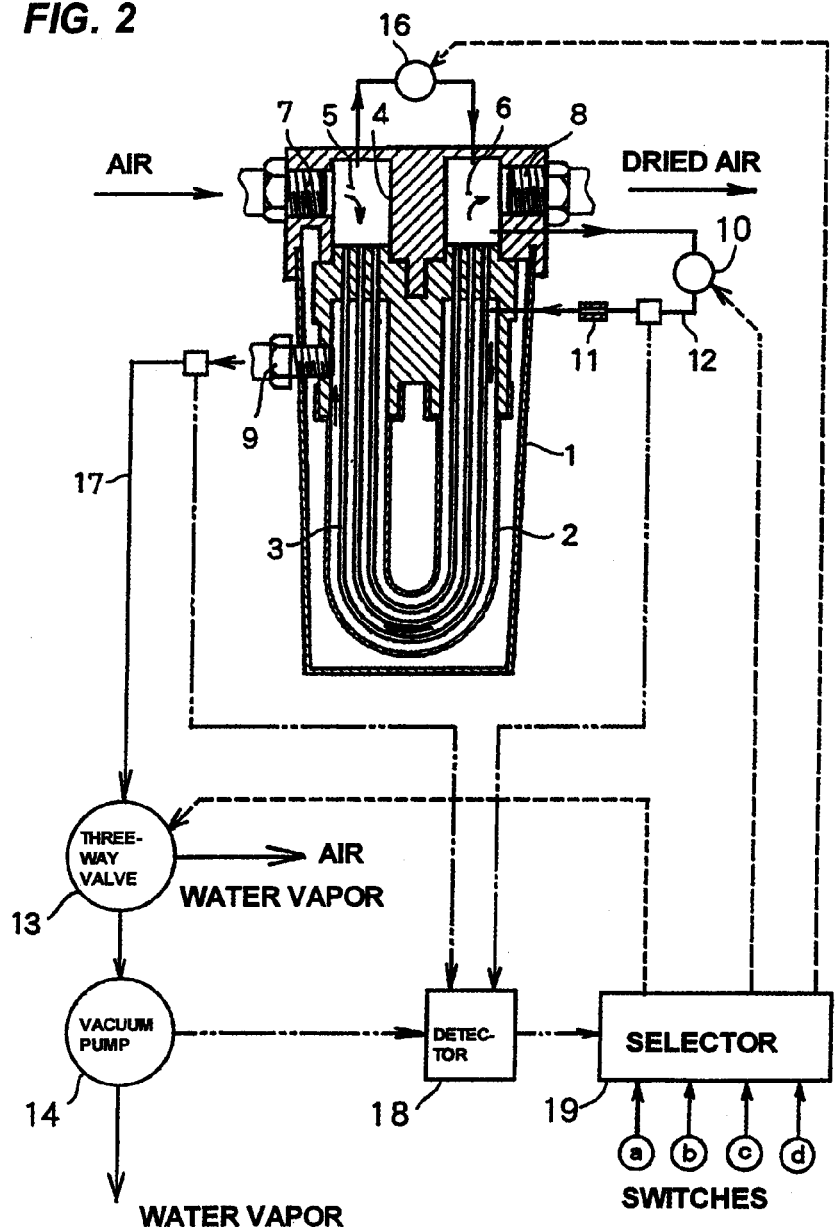
FIG. 2 is a vertical sectional view which shows the second embodiment of the present invention.
FIG. 3 is a table which shows an example of circuit switching in the second embodiment.

FIG. 2 shows another embodiment of the present invention, in which the same numerals are allotted to the same members as those in FIG. 1 and only different parts will be described.

An intake chamber 5 is connected to a discharge chamber 6 via a selector valve 16. There is a detector 18 for detecting abnormalities in a path 17 between a coupling 9 and a three-way valve 13, and in a bypass pipe 12 and in a vacuum pump 14.

A selector 19 is connected to a detector 18, and any one of switches (a) to (d) of the selector 19 allows a two-way valve 10, the three-way valve 13, the vacuum pump 14 and the selector valve 16 to be switched as shown in FIG. 3. Thus, one of the vapor-purging dehumidifier and the vacuum dehumidifier as in (a) and (c) or both in (b) are actuated, or neither is actuated thereby allowing the intake chamber 5 to communicate with the discharge chamber 6 by bypass as in (d).

The selection is automatically made by detecting the conditions of the path 17 and the bypass pipe 12 by the detector 18. Similar advantages to the first embodiment in FIG. 1 are achieved.

Instead of the vacuum pump in the vacuum-evacuating dehumidifier, a vacuum pump or an air ejector depressurizing device may be used.

The foregoing merely relate to embodiments of the invention. Various modifications and changes may be made by a person skilled in the art without departing from the scope of claims wherein:

What is claimed is:

1. A hollow fiber membrane air drier comprising:
   a casing;
   an intake chamber into which air is introduced;
   a discharge chamber for discharging dehumidified air;
   a hollow fiber membrane in which air flows between the intake chamber and the discharge chamber,
   a vacuum-evacuating dehumidifying unit for evacuating the water vapor in air by vacuum through the hollow fiber membrane;
   a water-vapor purging dehumidifying unit for dehumidifying air in the membrane by dried air from the discharge chamber; and
   a detector/selector connected to the vacuum-evacuating dehumidifying unit and the water-vapor evacuating dehumidifying unit to detect malfunction of the vacuum-evacuating dehumidifying unit and/or the water-vapor evacuating dehumidifying unit to selectively actuate the two dehumidifying units.

2. An air drier as claimed in claim 1 wherein the vacuum-evacuating dehumidifying unit comprises a three-way valve connected to the casing; and a vacuum pump, the three-way valve selectively communicating with the vacuum pump or air.

3. An air drier as claimed in claim 2 wherein the water-vapor purging dehumidifying unit comprises a two-way valve connected to the discharge chamber; and a depressurizing device connected to the casing so that dried air in the discharge chamber is partially forwarded to the casing to dehumidify air in the membrane.

4. An air drier as claimed in claim 3 wherein the detector/selector is connected to the vacuum pump, the three-way valve and the two-way valve, the casing normally communicating with the vacuum pump via the three-way valve with the two-way valve being closed, while if the vacuum pump is out of order, it is detected by the detector/selector to actuate the three-way valve and the two-way valve so that dried air in the discharge chamber is forwarded to the casing via the two-way valve.

5. An air drier as claimed in claim 3 wherein the two-way valve is closed by the detector/selector to make the water-vapor purging dehumidifying unit inactive and the vacuum-evacuating dehumidifying unit is actuated by the three-way valve if the water-vapor purging dehumidifying unit is out of order.

6. An air drier as claimed in claim 3, further comprising a selector valve via which the intake chamber is connected to the discharge chamber, the selector valve being connected to the detector/selector and opened if neither the two-way valve nor the vacuum pump is closed and if the three-way valve opens to air.

* * * * *